2,951,846

1-(4-METHYL-THIAZOLE-5-CARBONYL)-1,2-DIISO-PROPYL-HYDRAZINE AND CERTAIN SALTS

Otto Straub, Bottmingen, and Paul Zeller, Neuallschwil, Switzerland, assignors to Hoffmann-La Roche Inc., Nutley, N.J., a corporation of New Jersey No Drawing. Filed Oct. 27, 1958, Ser. No. 769,560
Claims priority, application Switzerland Oct. 29, 1957
2 Claims. (Cl. 260—302)

This invention relates to hydrazine derivatives. More particularly, the invention relates to heterocyclic hydrazine derivatives of the following structural formula

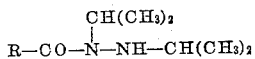

and acid addition salts of same.

In the above formula R may represent a 5-membered heterocyclic radical such as thiazolyl and lower alkyl substitution products of this radical.

The hydrazine derivatives of this invention may be produced by condensing 1,2-diisopropyl-hydrazine or an acid salt thereof, e.g. a hydrohalide, with an acylating agent bearing the appropriate acyl group, e.g. an acyl halide, preferably the chloride or an acid anhydride. Approximately equimolecular proportions of 1,2-diisopropyl-hydrazine and acylating agent are used in the condensation reaction. If an acyl halide is used as one reactant, the reaction is preferably carried out in the presence of a tertiary base, such as pyridine or triethylamine or of an excess of 1,2-diisopropyl-hydrazine.

The compounds of this invention form acid addition salts by reaction with inorganic and organic acids, and these salts are also within the scope of the invention. Illustrative salts include the hydrohalides, e.g. the hydrochloride, the hydrobromide, the hydroiodide; other mineral acid salts such as the phosphate, the sulfate, the nitrate etc.; and organic salts, such as the oxalate, tartrate, ascorbate, citrate and the like.

The compounds of this invention are monoamine oxidase inhibitors, that is, they inhibit the activity of monoamine oxidase which effects the deamination of physiological regulators such as serotonine, tryptamine, epinephrine, etc., and stimulate the central nervous system. They are useful in psychotherapy for relief of disturbed or depressed states. They are also useful for increasing weight in cases where cachexia is present. The free hydrazine compound or a medicinally acceptable acid addition salt thereof may be administered orally or parenterally in conventional solid or liquid dosage forms, such as tablets, capsules, injectables, etc., comprising therapeutic doses incorporated in a conventional solid or liquid vehicle with or without excipients.

The following example is illustrative of the invention. All temperatures are stated in degrees centigrade.

Example

A solution of 16.1 g. of 4-methyl-thiazole-5-carboxylic acid chloride in 100 cc. of absolute benzene was added dropwise over a period of 2½ hours, while stirring at room temperature, to a solution of 25.5 g. of 1,2-diisopropyl-hydrazine in 400 cc. of absolute benzene. 1,2-diisopropyl-hydrazine hydrochloride precipitated. The mixture was stirred for an additional 4 hours at 40°, then allowed to cool to room temperature and filtered. The filtrate was washed with water and with a saturated sodium bicarbonate solution, dried over sodium sulfate and concentrated in vacuo to dryness. The residue, consisting of 1-(4-methyl-thiazole-5-carbonyl)-1,2-diisopropyl-hydrazine melted, after recrystallization from petroleum ether, at 52–53°.

We claim:

1. 1-(4-methyl-thiazole-5-carbonyl) - 1,2 - diisopropyl-hydrazine.

2. A compound selected from the group consisting of 1-(4-methyl-thiazole-5-carbonyl)-1,2-diisopropyl - hydrazine and medicinally acceptable acid addition salts thereof.

References Cited in the file of this patent

UNITED STATES PATENTS

| | | |
|---|---|---|
| 2,727,896 | Yale et al. | Dec. 20, 1955 |
| 2,753,352 | Bernstein et al. | July 3, 1956 |
| 2,774,757 | Kuhle et al. | Dec. 18, 1956 |
| 2,855,400 | Gutmann et al. | Oct. 7, 1958 |

FOREIGN PATENTS

| | | |
|---|---|---|
| 1,088,593 | France | Sept. 15, 1954 |
| 729,967 | Great Britain | May 11, 1955 |
| 769,481 | Great Britain | Mar. 6, 1957 |

OTHER REFERENCES

Yale et al.: J. Am. Chem. Soc., vol. 75, pp. 1933–1942 (1953).